(12) United States Patent
Mengwasser (10) Patent No.: US 12,141,585 B2
(45) Date of Patent: Nov. 12, 2024

(54) METHOD AND SYSTEM TO MONITOR DRIFT IN A VIRTUAL DEVELOPMENTAL ENVIRONMENT OF ABSTRACTED CONTAINERIZED APPLICATIONS

(71) Applicant: DISH Wireless L.L.C., Englewood, CO (US)

(72) Inventor: Brian Mengwasser, Denver, CO (US)

(73) Assignee: DISH Wireless, L.L.C., Englewood, CO (US)

( * ) Notice: Subject to any disclaimer, the term of this patent is extended or adjusted under 35 U.S.C. 154(b) by 4 days.

(21) Appl. No.: 17/949,114

(22) Filed: Sep. 20, 2022

(65) Prior Publication Data

US 2023/0100322 A1    Mar. 30, 2023

Related U.S. Application Data

(60) Provisional application No. 63/261,445, filed on Sep. 21, 2021.

(51) Int. Cl.
*G06F 9/38* (2018.01)
*G06F 9/30* (2018.01)
*G06F 9/54* (2006.01)

(52) U.S. Cl.
CPC ............ *G06F 9/3844* (2013.01); *G06F 9/547* (2013.01)

(58) Field of Classification Search
CPC ................................ G06F 9/3844; G06F 9/547

USPC ......................................................... 712/239
See application file for complete search history.

(56) References Cited

U.S. PATENT DOCUMENTS

| | | | |
|---|---|---|---|
| 7,254,524 B1 * | 8/2007 | Richey .................. | H04L 41/145 709/200 |
| 2016/0357660 A1 * | 12/2016 | Dean ......................... | G06F 8/00 |
| 2022/0001537 A1 * | 1/2022 | Hashiguchi ............ | B25J 9/1676 |
| 2022/0066916 A1 * | 3/2022 | McQuee ................ | G06F 9/451 |
| 2023/0288888 A1 * | 9/2023 | Fiebiger ................ | G05B 15/02 700/282 |

* cited by examiner

*Primary Examiner* — Chun Kuan Lee
(74) *Attorney, Agent, or Firm* — KW Law, LLP (57) ABSTRACT

Systems and methods are provided to monitor drift in branches of code associated with virtualized containers of cellular services developed in a virtual platform that include a set of core network components associated with a network slice to provide network functions and microservices wherein the virtual plane includes a development test environment for developing at least instructional sets of branch code; a development application to configure an instructional set including branch code for associating with one or more containers that clone a plurality of network functions and microservices of the cellular services deployed in physical infrastructure; and a drift monitoring tool that based on simulations from tests of a developed branch code executed with containers of cloned network functions and microservices provide data to developers of drift caused by the branch code to operations of the network functions and microservices contained in the physical infrastructure.

20 Claims, 5 Drawing Sheets

METHOD AND SYSTEM TO MONITOR DRIFT IN A VIRTUAL DEVELOPMENTAL ENVIRONMENT OF ABSTRACTED CONTAINERIZED APPLICATIONS

CROSS-REFERENCE TO RELATED APPLICATIONS

This application claims priority to U.S. Provisional Patent Application No. 63/261,445 filed on Sep. 21, 2021 and entitled "METHOD AND SYSTEM TO MONITOR DRIFT IN A VIRTUAL DEVELOPMENTAL ENVIRONMENT OF ABSTRACTED CONTAINERIZED APPLICATIONS," which is incorporated herein by reference.

TECHNICAL FIELD

The following discussion generally relates to branch program code development for network functions and microservices in wireless communications systems. More particularly, the following discussion relates to systems, and processes for monitoring drift in the development of code associated with network functions and microservices abstracted in a virtual domain prior to actual deployment.

BACKGROUND

The virtualization of the radio access network (RAN) of next-generation (5G) wireless systems enables applications and services to be physically decoupled from devices and network infrastructure. However, with the virtualization of network functions and microservices, in code development via branch techniques of further services, particularly enhancements to core network (CN) functions, monitoring of drift in the branch of the developed code particularly in a containerized application is required to ensure seamless deployment in the network.

Drift in a virtualized platform is caused by the lack of visibility of developers into the impact of changes caused by new code and application changes to systems that are also interwoven over time with smaller individual program branch changes in containerized branches that are not fully understood until introduced in either commonplace canary program code changes that are pushed to small groups of end-users, or actual network deployments of network functions and microservices. With abstracting of complex systems and configurations that are dynamic in nature, in static abstractions, it is recognized by application developers that actual instances of drift are avoidable. However, developers desire the magnitude of the drift to be controlled and this requires constant and proper monitoring to ensure that significant gaps are not created resulting in unacceptable differences between an originally abstracted application and the developed product. If the gaps caused are significant, the developed branch may have lesser or no value, or may in fact have a detrimental effect on the original baseline operations of the implemented services that are currently in use.

It is desired to provide solutions to dynamically monitor differences in the development of the abstracted application that are containerized to ensure that the impact of the drift is acceptable (within an acceptable tolerance) and does not exceed threshold criteria by providing tools that provide visibility to developers when programming branches of codes in a virtualized domain prior to the actual code deployment and implementation into the physical layers of a network.

It is desired to reduce the risk of adverse impacts caused by drift beyond tolerated margins to core network functions or microservices that can impact the load without canary testing.

It is desired to reduce drift in code development experienced by previous vendor functions (NFs) at an original network slice when migrating to newer or different vendor functions (NFs) with enhancements by developments in the virtual domain that have not been tested in current physical deployments and to prevent interrupt or impede connectivity to subscribers.

Furthermore, other desirable features and characteristics of the present invention will become apparent from the subsequent detailed description and the appended claims, taken in conjunction with the accompanying drawings and the foregoing technical field and background.

DESCRIPTION OF THE DRAWINGS

The exemplary embodiments will hereinafter be described in conjunction with the following drawing figures, wherein like numerals denote like elements, and wherein.

BRIEF SUMMARY

Systems, devices, and automated processes are provided to monitor and provide visibility of drift caused or impacted by software development of new code built in a branch coding technique associated with a containerized network function, service, or microservice of a cloud-based cellular service that is instantiated in a virtual domain prior to deployment in the network infrastructure.

In an exemplary embodiment, a system to monitor drift in branches of code that is developed wherein the code branches are associated with virtualized containers of cellular services is provided. The system includes a virtual platform including a configuration of a set of core network components in a virtual plane associated with a network slice to provide network functions and microservices wherein the virtual plane includes a development test environment for developing at least instructional sets of branch code; a development application to configure an instructional set including branch code for associating with one or more containers that clone a plurality of network functions and microservices of the cellular services deployed in physical infrastructure; a drift monitoring tool that based on simulations from tests of a developed branch code executed with containers of cloned network functions and microservices provide data to developers of drift caused by the branch code to operations of the network functions and microservices contained in the physical infrastructure; and a graphical user interface to display a set of parameters that enable a developer to determine an impact of the developed branch code pertaining to containerized cloned network functions and microservices prior to deployment of the developed branch code in the physical infrastructure.

In at least one exemplary embodiment, the system further includes a set of criteria to configure the drift monitoring tool and for displaying in the graphical user interface a computed amount of drift caused by a traffic simulation in conjunction with branch code execution.

In at least one exemplary embodiment, the system further includes wherein the set of criteria includes at least development time and changes in network parameters resultant from a branch code deployment in components of the physical infrastructure.

In at least one exemplary embodiment, the system further includes wherein the containerized network functions and microservices are hosted on a third-party cloud server.

In at least one exemplary embodiment, the system further includes wherein the developed branch code is deployed in native cloud applications providing the network functions and microservices to cellular components of a network slice on the third-party platform.

In at least one exemplary embodiment, the system further includes the virtual platform configured at least with at least one container of instruction code with the developed branch code associated with at least one network function deployed for testing with one or more native cloud applications configured in at least one layer of an app layer, service layer, orchestration layer, application layer, virtual machine layer, and physical layer.

In at least one exemplary embodiment, the system further includes the virtual platform configured at least with at least one container of instruction code with the developed branch code associated with at least one microservice application deployed for testing with one or more native cloud applications configured in at least one layer of an app layer, service layer, orchestration layer, application layer, virtual machine layer, and physical layer.

In at least one exemplary embodiment, the system further includes wherein the at least one network function includes a policy and charging control function (PCFs), Binding Support Function (BSFs), Network Exposure Function (NEFs), Network Slice Selection Function (NSSF), Service Communications Proxy (SCP) function, and Security Edge Protection Proxy (SEPP) function.

In at least one exemplary embodiment, the system further includes wherein the drift at least includes a computed change in a parameter of a configuration of components of the network slice when the developed branch code is executed by the network functions or microservices in at least a control plane of the physical infrastructure; and wherein the drift computed change is increasingly different over a period of time due to a plurality of factors at least including updates on components contained in network slices.

In another exemplary embodiment, a method for monitoring drift in a branch of code that is developed wherein the code branch is associated with a virtualized container of cellular service is provided. The method includes configuring on a virtual platform a set of core network components in a virtual plane associated with a network slice to provide network functions and microservices wherein the virtual plane includes a development test environment for developing at least an instructional set of the branch code; configuring by a development application at least the instructional set including branch code for associating with one or more containers that clone a plurality of network functions and microservices of the cellular services deployed in physical infrastructure; computing by a drift monitoring tool from test simulation of traffic in the virtual plane, an amount of drift caused by branch code which has been developed in the virtual plane and associated with one or more containers of cloned network functions and microservices executed in the development test environment in the virtual plane wherein the amount of drift computed is by comparison to operations of the network functions and microservices contained in the physical infrastructure; and displaying in a graphical user interface based on a set of parameters that have been selected by a developer, a determination of an impact of the computed amount of drift by a developed branch code of containerized cloned network functions and microservices in the physical infrastructure prior to deployment of the developed branch code in the physical infrastructure.

In at least one exemplary embodiment, the method further includes configuring a set of criteria for the drift monitoring tool for displaying in the graphical user interface and generating the computed amount of drift caused by a traffic simulation in conjunction with branch code execution.

In at least one exemplary embodiment, the method further includes a set of criteria to configure the drift monitoring tool and for displaying in the graphical user interface a computed amount of drift caused by a traffic simulation in conjunction with branch code execution.

In at least one exemplary embodiment, the method further includes wherein the containerized network functions and microservices are hosted on a third-party cloud server.

In at least one exemplary embodiment, the method further includes wherein the developed branch code is deployed in native cloud applications providing the network functions and microservices to cellular components of a network slice on the third-party platform.

In at least one exemplary embodiment, the method further includes configuring in the virtual plane with at least one container of instruction code with the developed branch code associated with at least one network function deployed for testing with one or more native cloud applications configured in at least one layer of an app layer, service layer, orchestration layer, application layer, virtual machine layer and physical layer of the physical infrastructure.

In at least one exemplary embodiment, the method further includes configuring the virtual platform with at least one container of instruction code with the developed branch code associated with at least one microservice application deployed for testing with one or more native cloud applications configured in at least one layer of an app layer, service layer, orchestration layer, application layer, virtual machine layer, and physical layer.

In at least one exemplary embodiment, the method further includes wherein at least one network function includes a policy and charging control function (PCFs), Binding Support Function (BSFs), Network Exposure Function (NEFs), Network Slice Selection Function (NSSF), Service Communications Proxy (SCP) function, and Security Edge Protection Proxy (SEPP) function.

In at least one exemplary embodiment, the method further includes wherein the drift at least includes a computed change in a parameter of a configuration of components of the network slice when the developed branch code is executed by the network functions or microservices in at least a control plane of the physical infrastructure; and wherein the drift computed change is increasingly different over a period of time due to a plurality of factors at least including updates on components contained in network slices.

In yet another exemplary embodiment, a computer program product tangibly embodied in a computer-readable storage device that stores a set of instructions that when executed by a processor perform a method to monitor drift caused by code developed in a branch wherein the branch is associated with at least one container in a virtual plane including cellular services is provided. The method includes configuring on a virtual platform a set of core network components in the virtual plane associated with a network slice to provide network functions and microservices wherein the virtual plane includes a development test environment for developing at least instructional sets of branch code; configuring by a development application an instructional set including branch code for associating with one or more containers that clone a plurality of network functions and microservices of the cellular services deployed in physical infrastructure; determining by a drift monitoring tool from test simulation of traffic in the virtual plane, an amount of drift caused by branch code which has been developed in the virtual plane and associated with one or more containers of cloned network functions and microservices executed in the development test environment in the virtual plane wherein the amount of drift determined is by comparison to operations of the network functions and microservices contained in physical infrastructure; and displaying in a graphic user interface based on a set of parameters that have been selected by a developer, a determination of an impact of the computed amount of drift by a developed branch code of containerized cloned network functions and microservices in the physical infrastructure prior to deployment of the developed branch code in the physical infrastructure.

In at least one exemplary embodiment, the method further includes configuring in the virtual plane with at least one container of instruction code with the developed branch code associated with at least one network function or microservices deployed for testing with one or more native cloud applications configured in at least one layer of an app layer, service layer, orchestration layer, application layer, virtual machine layer and physical layer of the physical infrastructure.

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

The virtualization of the radio access network (RAN) of next-generation (5G) wireless systems enables applications and services to be physically decoupled from devices and network infrastructure. This enables the dynamic deployment of different services by different network operators over the same physical infrastructure. RAN slicing utilizes virtualization which allows the operator to provide dedicated logical networks with customer-specific functionality without losing the economies of scale of a shared infrastructure. When implementing these virtual networks, mobile devices and other user equipment can experience challenges in properly connecting and operating in environments where each network provides different "slices" of bandwidth for various quality of service (QoS).

Cloud-native is an architecture where services are segmented into smaller or microservices for deploying and reusing in third-party data centers, or a multitenant cloud platform. Cloud-native is the moving of premise-based applications to a server-based model where the servers are provided by third parties. The result is a cloud-based application without significant changes in the application for cloud enablement. This migration to the cloud approach can be used for legacy-based applications that are to be hosted in the cloud. Deployment of a cloud-native 5G network, includes an O-RAN architecture-based radio access network and a 5G core network. At the same time, OSS and BSS systems will also be deployed on the third-party cloud.

Cloud-Native Computing Foundation (CNCF), is an open-source software foundation under the umbrella of Linux Foundation (LF), defines Cloud Native as Cloud Native technologies with application containerization built for dynamic environments such as public, private, and hybrid clouds. Containers, service meshes, microservices, immutable infrastructure, and declarative Application Programming Interfaces (API) exemplify this approach. CNCF provides structure and constraints for being Cloud Native, requiring that the applications being developed and architected use microservices methodologies to be deployed as Containers. The applications when broken down into small, reusable components are referred to as "microservices." The Cloud Native microservices are "stateless" which means there is a separation of processing from the associated data and the storage of the data in the Cloud.

In exemplary embodiments, the orchestration in a cloud-based cellular network, particularly with respect to container orchestrator, the KUBERNETES® platform may be used to actively schedule and optimize resource utilization.

In exemplary embodiments, Network slicing enables creating multiple virtual networks on a common physical infrastructure that guarantees an agreed SLA for specific functionality requested from different service providers or tenants. Each slice provides complete network functionality including radio access network functions, and core network (CN) functions.

In exemplary embodiments, the 5G cellular network requires a horizontal separation between the 5G network's software-based features and functions (such as the 5G standalone (SA) core and software-based components of the radio access network) and the cloud infrastructure implemented. In embodiments, the 5G network functions use complementary 'cloud-native architectural principles, DevOps tools, and technology stack. The cloud-native 5G network includes cloud-native network functions (CNFs), cloud-native operational capabilities, and associated cloud-native services which are orchestrated together as a single entity to deliver 5G networking functionality. This 5G network cloud application can be executed on an elastic, cloud-native infrastructure that may be deployed about distributed edge locations. The cloud-native applications can be executed in a lightweight container on a container-based platform that is controlled by an orchestrator implemented in the cloud.

In exemplary embodiments, the 5G core network is divided into the control plane (CP) and the user plane (UPF). The CP can be centrally deployed in large areas, and UPF can be distributed in various regions or within an enterprise. The new code built-in branches in cloud-native app development include marrying microservices, cloud platforms, containers, KUBERNETES®, immutable infrastructure, declarative APIs, and runtime deployment services with techniques like DevOps and agile methodology.

In exemplary embodiments, the 5G RAN architecture includes CU, DU, and RU units that can be imaged and implemented in software in a development platform. In embodiments, the CU and DU units can be virtualized and deployed centrally, and RUs can be deployed at various sites. The virtualization of the 5G core network and access network enables the deployment of the network function software end-to-end on a third-party cloud infrastructure.

Network slicing is part of the Next Generation Mobile Network (NGMN) alliance and standardized by the 3GPP enabling it to be integrated into the ETSI-NFV architecture. The NFV standards define the interaction between the network slice management functions defined by the 3GPP and the NFV Management and Orchestration (MANO) module and establish the required connection between the network controllers and the NFV orchestration unit to perform the dynamic assignment of network resources.

In various embodiments, the network slicing in 5G can be configured to share physical network resources to multiple virtual networks. The network slices can include a set of virtualized networks on the top of a physical network. The network slices can be allocated to specific applications/services, use cases, or business models to meet SLA requirements. Each network slice can be operated independently with its virtual resources, topology, data traffic flow, management policies, and protocols. The network slicing architecture contains access slices (both radio access and fixed access), core network (CN) slices, and the selection function that connects these slices into a complete network slice that includes both the access network and the CN. The selection function routes communications to an appropriate CN slice that is tailored to provide specific services. The criteria of defining the access slices and CN slices include the need to meet different service/applications requirements and to meet different communication requirements. Each CN slice is built from a set of network functions (NFs). In embodiments, some NFs in network slices can be used across multiple slices, while other NFs are tailored to a specific slice. The NFV Infrastructure (NFVI) provides an infrastructure with both physical and virtual resources to deploy, manage, and execute VNFs. The hardware resources in the infrastructure can include computing, storage, and network are abstracted by Virtualization Layers to provide processing, storage, and connectivity to VNFs with independent lifecycles.

In exemplary embodiments, drift can include differences that result in the execution of the code when deploy when compared to an original code clone or virtualized in the cloud. Drift can refer to changes in the parameters of the configuration as well as the code in the deployment environment such as when executing clusters in infrastructure and the drift can become increasingly different over time, due to updates in the clusters, new releases, and manual changes and updates on individual clusters. The changes that cause drift can occur by developers, and operators as each party may not have visibility in the other party's revisions and updates. Preventing drift requires dynamic monitoring of drift-related parameters.

In exemplary embodiments, a branch in code development is an instruction in a program that initiates a different instruction sequence deviating from a routine or current modus of behavior in an instruction set.

Figure 1:
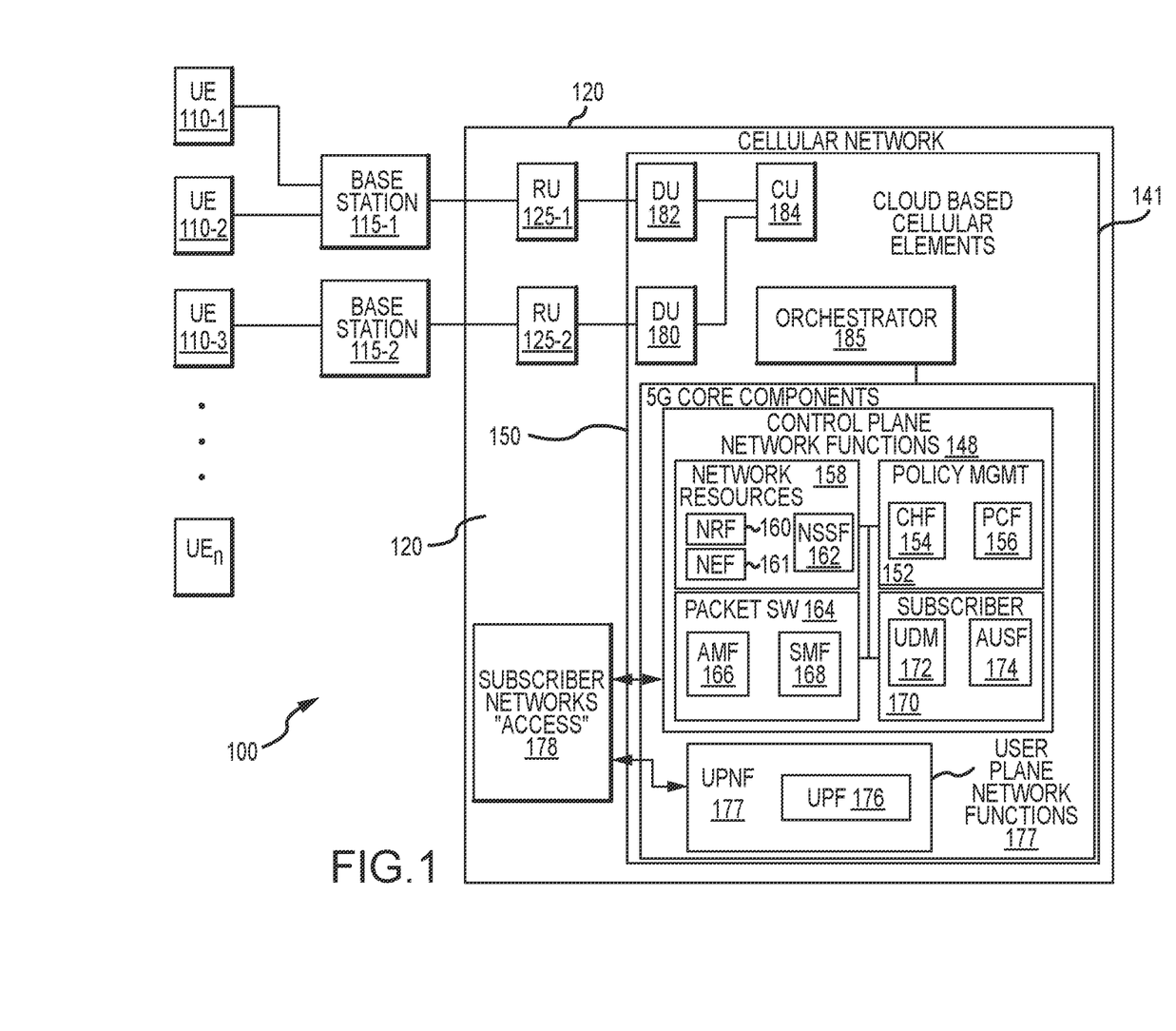
FIG. 1 is an exemplary diagram of 5G architecture with core network functions of the wireless new radio network in which applications can be abstracted in the virtual domain for developments and eventual deployment in accordance with various exemplary embodiments.

FIG. 1 illustrates an embodiment of a cellular network 100 that includes a 5G New Radio Cellular system ("System") in accordance with various embodiments. The System includes UEs (110-1, 110-2, 110-3, 110-n) in communication via base stations (115-1, 115-2, etc) for a set of gNBs of the cellular network 120 that include NR units. The UEs 110-1, 110-2, etc. are connected via interfaces to cloud based cellular elements 141 of user plane network functions (UPNFs) 177, and Control Plane Network Functions (CPNFs) 148 of the service-based architecture. The UPNF 177 includes the User plane function (UPF) 176 and the data networks (DN) 180, 182, and CU 184. The CPNFs 148 includes the service base interface that is connected to the AMF, SMF, AF, NSSF, AUSF, UDF, PCF, NEF, NRF. The 3GPP defines a Service-Based Architecture (SBA) (i.e., the service base interface 165), whereby the control plane functionality and common data repositories of a 5G network are delivered by way of a set of interconnected Network Functions (NFs), each with authorization to access each other's services.

The 5G core includes a set of functional blocks of a control plane of the policy management functions of the CHF 154 and the PCF (Policy Control Function) 156, the network resource management 158 that includes the NRF (NF Repository Function) 160, NEF (Network Exposure Function) 161, and the NSSF 162 (Network Slicing Selector Function) to register and discover various available resources using standards-based application programming interfaces (APIs). The NEF 161 enables select capabilities to third-party services, including translation between internal and external representations for data. Could be implemented by an "API Server" in a microservices-based system. The NRF 160 enables the discovery of available services and can be implemented by a "Discovery Service" in a microservices-based system. The NSSF 162 enables a selection of a Network Slice to serve a given UE; network slices are essentially a way to partition network resources to differentiate services given to different users. The PCF 156 manages the policy rules that other CP functions then enforce.

Packet control 164 includes the AMF (Core Access and Mobility Management Function) 166 and the SMF (Session Management Function) 168 can receive session and connection information. The AMF 166 is responsible for connection and reachability management, mobility management, access authentication and authorization, and location services. The SMF 168 manages each UE session, including IP address allocation, selection of associated user plane function (UPF) 176, control aspects of QoS, and control aspects of UP routing.

The subscriber management 170 includes the UDM (Unified Data Management) 172 and AUSF (Authentication Server Function) 174 for generating authenticating vectors, user identification handling, network function registration, and retrieval of UE subscription data. The UDM 172 manages user identity, including the generation of authentication credentials. The AUSF 174 is essentially an authentication server.

The user plane includes the user plane function (UPF) 176. The UPF 176 forwards traffic between RAN and the access networks 178. In addition to packet forwarding, it is responsible for policy enforcement, lawful intercept, traffic usage reporting, and QoS policing.

The network slice components (i.e., the cellular network 120) and the cloud based cellular elements 141 support the communication service of a particular connection type with a specific way of handling the Control Plane (CP) and User Plane (UP) that for the service. To this end, a Network slice namely "5G slice" is composed of a collection of 5G network functions and specific Radio Access Technology (RAT) settings that are combined for the specific use case or business model. Thus, a 5G slice can span all domains of the network, software modules running on cloud nodes, specific configurations of the transport network supporting the flexible location of functions, a dedicated radio configuration or even a specific RAT, as well as the configuration of the 5G device. Third-party entities such as the access networks 178 can be permitted to control certain aspects of slicing via a suitable Application Programmable Interface (API) to provide tailored service.

In an exemplary embodiment, the vRan or O-RAN (i.e., cellular network 120) can be implemented in part in a virtual plane and can include the components virtualized of DUs, CUs, and other 5G core network functions configured locally on a third-party hosted server or in separate servers as desired. The network function and services can be compartmentalized using a container orchestration platform like KURBERNETES® which allows for instantiation by the orchestrator in the virtual plane prior to deployment.

The orchestrator 185 monitor the network components and implements various software processes, algorithms executed by various computer hardware (resources), and determine the number of network functions and services that should be deployed to meet service level agreements (SLAs) across each network slice of the cellular network. In an exemplary embodiment, the orchestrator 185 can instantiate new cloud components (i.e., newly developed branch code associated with containerized services in the virtual plane) and can perform a pipeline of calls and requests associated with the DU code and corresponding configuration files. The orchestrator 185 can also be responsible for creating the containerized KUBERNETES® pods and activating other support functions. While orchestrator 185 may initiate new code in branch with an associated container, the drift monitoring system (see FIG. 3) is responsible for measuring parameters indicative of the amount of drift experienced by the new code based on a test simulation when instantiated by the orchestrator 185 in the virtual or cloud environment. The orchestrator 185 can introduce imaged containers of DU, CU, and other functions to enable the test simulation in the cloud-based cellular system prior to deployment (i.e., a canary type of deployment) in the physical infrastructure.

Figure 2:
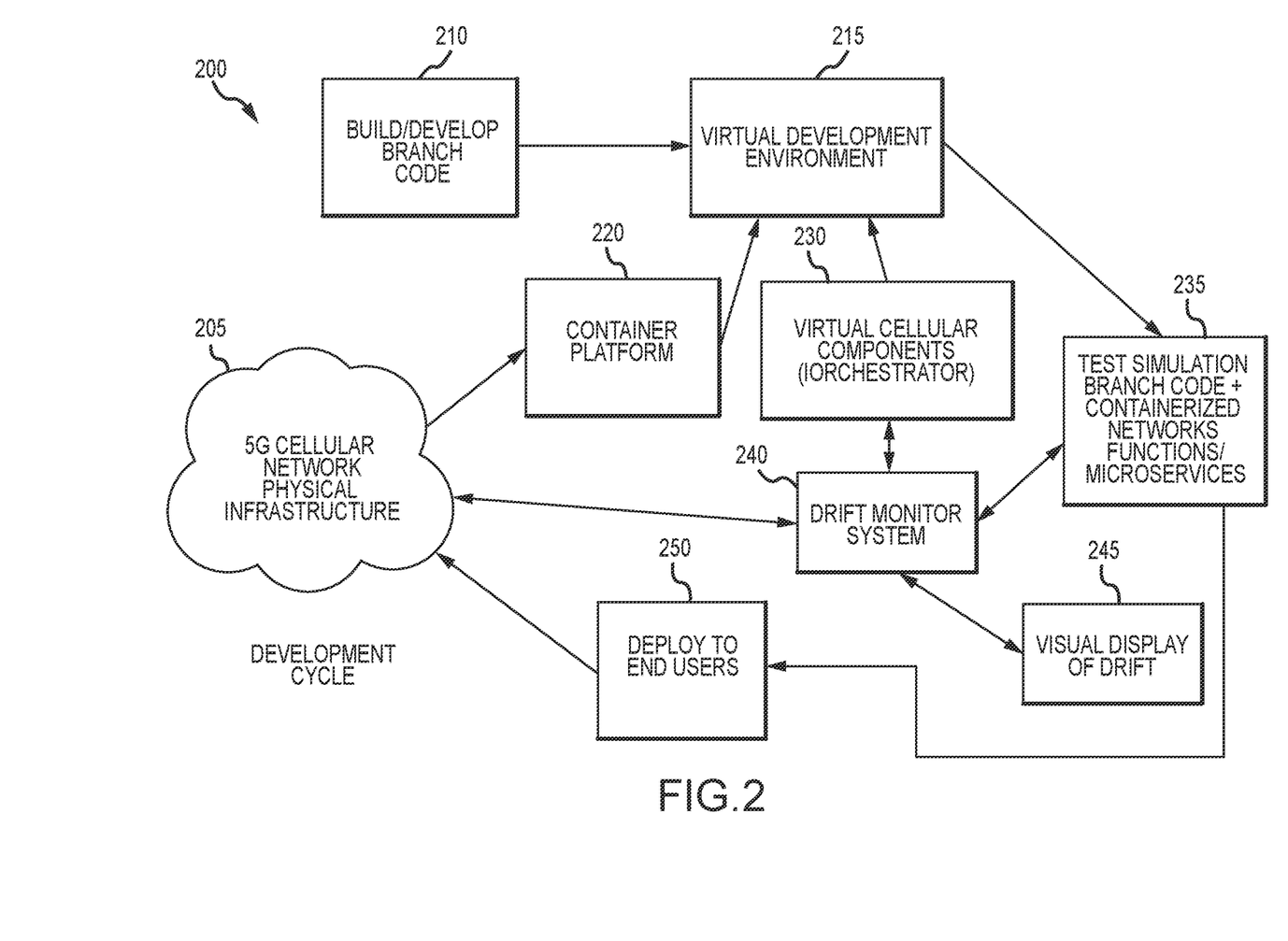
FIG. 2 illustrates an exemplary diagram of a branch code development and deployment cycle for cloud-based applications in a cellular network in accordance with various exemplary embodiments.

FIG. 2 illustrates an exemplary diagram of a branch code development and deployment cycle for cloud-based applications in a cellular network in accordance with various embodiments. FIG. 2 illustrates an exemplary DevOps cycle 200 for the testing and rollout of new code developed in branches and associated with containers orchestrated in a virtual or cloud environment for testing and determining drift prior to deployment. A selection of the 5G infrastructure components at 205 is imaged via a container platform at 220 to a cloud-based environment at 215 in which a new branch code is associated with selected containers of various network functions and services. In an exemplary embodiment, the branch code is built or developed at 210 and instantiated by an orchestrator at 230 with the respective containerized services and network functions. The test simulation at 235 can be performed using a traffic simulator to ensure that the new code when integrated with certain network functions and/or microservices meets required SLAs prior to deployment. Further, with the test simulation at 235, the amount of drift at 240 can be checked with the infrastructure components at 205 to ascertain changes in parameters and configurations that have occurred in the physical infrastructure as well as the impact caused when the new branch code is executed in the physical infrastructure. The drift monitoring system at 240 receives information from the orchestrator at 230 of the instantiation of software components in the virtual plane that makes up the 5G virtual network at 215. The amount of drift computed or detected is displayed via the visibility process at 245 so a developer is aware of the impact of the new branch code changes to parameters in the physical infrastructure at 205 at deployment. The virtual development environment at 215 is associated with various layers further described in FIG. 3 of the 5G network.

The amount of drift that is monitored at 240 will likely increase based on parameters that include the time of developing the new branch code and integration into containerized network functions and services, the manner the branch code interacts or changes processes of prior network functions and services, and the impact caused by the changes that propagate through the physical infrastructure at 205 as the changes are scaled or distributed.

The U.S. Provisional patent application Ser. No. 63/226, 913 filed on Jul. 29, 2021, Entitled "MULTI-ENVIRONMENT CELLULAR NETWORK CHAOS TESTING" with inventors Brian Mengwasser, Robert Kierzyk, Henry Yu, and Brarda Gnacio, is incorporated by reference and describes a multi-environment for introducing chaos in a development test environment, performing chaos testing in the test environment, performing chaos testing using diverted traffic slice, and obtaining results of the chaos testing using diverted traffic. In various embodiments, applications of the testing schema used in chaos testing may have applicability to test simulations of a traffic simulator to monitor, compute and/or determine the cause, impact, and propagation of drift caused by branch code with instruction sets built in a virtual cellular domain prior to the deployment, canary deployment and/or rollout in the physical infrastructure.

Figure 3:
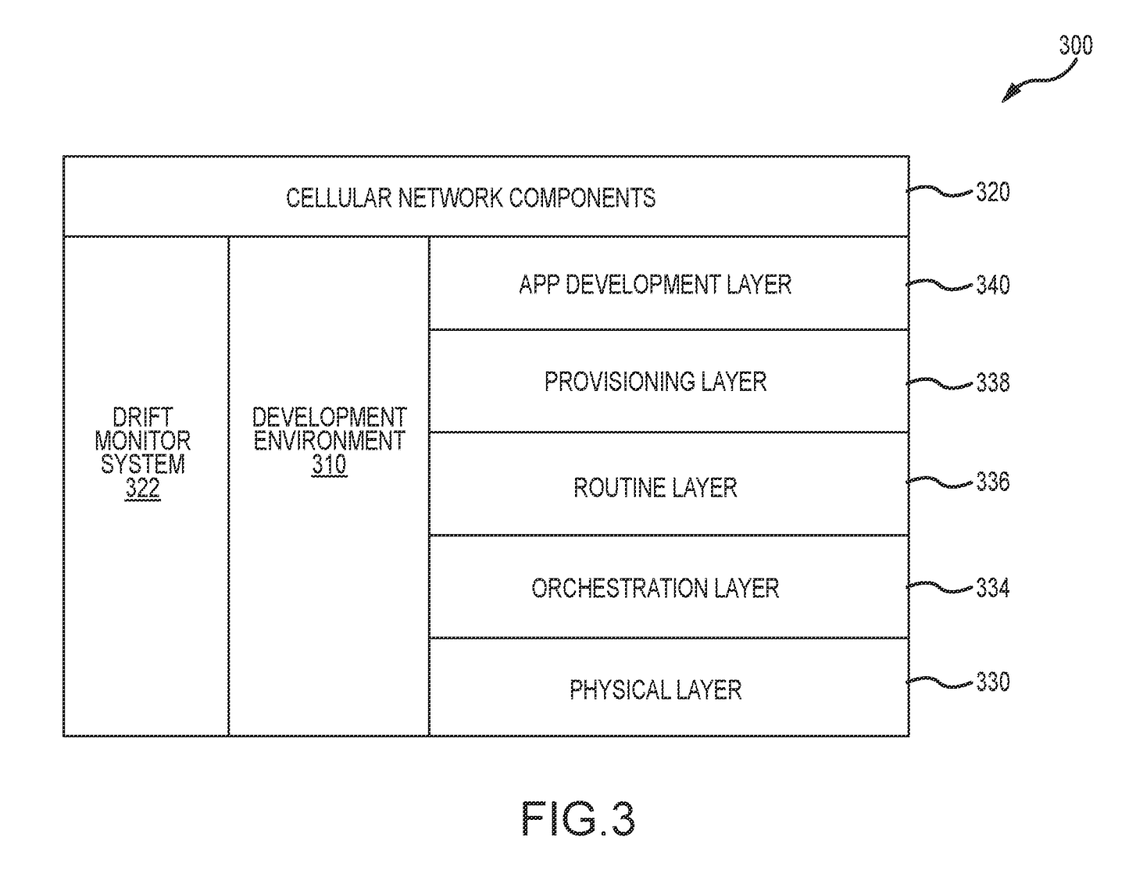
FIG. 3 illustrates an exemplary diagram of a set of multiple layers of a cellular development environment for use with the drift monitor system in accordance with various exemplary embodiments.

FIG. 3 illustrates a diagram of a set of multiple layers of a cellular development environment for use with the drift monitor system in accordance with various embodiments. In FIG. 3, the drift monitor system 322 assesses drift based on criteria for deployment of developed branch code associated container virtualized for microservices and core network functions that have been cloned of current physical network implementation in accordance with various embodiments. The virtual development environment includes the multiple layers of is a diagram 300 that lays out a static or dynamic configuration in which the branch code is built.

In FIG. 3 there is shown a set of development layers in a development environment 310 that communicates with a drift monitor system 322 for new branch code instantiated with various cellular components of a network slice that include core network functions and services implemented in the multiple layers. In FIG. 3, the top layer 340 forms the app definition and development layer (i.e., app development layer) where new code branches are built and integrated for app services or microservices, and network functions (described in FIG. 1) of cellular network components 320. In an exemplary embodiment, the top layer or app development layer 340 may be associated with the cloud-native stack and focuses on the tools used by developers to build applications, such as databases, messaging systems, container images, and continuous integration and continuous delivery pipelines. The provisioning layer 238 can also be associated with the cloud-native stack and includes resources required to build and secure the environment where an application will execute. The development environment 310 in a cloud-native type environment may involve treating infrastructure as code, storing images in a repository, automating builds, and addressing application security needs with vulnerability scanning, key and policy management, and authentication tools. The runtime layer 336 concerns programs associated with the running of the cloud-native application, such as the container runtime, as well as storage and networking. The orchestration and management layer 334 brings together the tools required to deploy, manage, and scale containerized applications, including orchestration and scheduling. This layer is directed to KUBERNETES® platform implementation and service discovery, service proxy, API gateway, and service mesh.

In various exemplary embodiments, The development environment 310 is configured in the virtual plane and enables simulated tests to be performed in each of the layers. The physical layer 330 refers to the components of the physical infrastructure in which parameters prior to implementation of virtual developed products in the app development layer 340, the runtime layer 336, orchestration layer 333, provisioning layer 338 are compared and changes computed to determine by the drift monitoring system (i.e., drift watchdog tool) 322 the amount of drift prior to the deployment of the new branch program code into the physical layer 330 and components in this layer. In the physical layer 330, simulation of various servers and server configurations can be measured for drift associated with changes in the server configurations. In the orchestration layer 334, the containers of the selected network functions or microservices are made (i.e., this layer can be equated to the implementation of the KUBERNETES® or other container platform for selection and development of the branch code in the development environment 310). Also, the other virtualized components DUs and CUs, and the cloud-based applications, 5G core network functions can be simulated in deployment with appropriate addressing, firewalls to which the drift caused by new code and instructions determined. The same holds for the application development layer 340 where service applications that can include the microservices in the development environment 310 that have been enhanced with new branch code, can be tested, and the drift via the drift monitoring system 322 can be monitored or measured. Outside these layers, the drift monitor system 322 implements desired or required observability practices, so all these services (not only the enhanced services) are monitored effectively prior to and at deployment.

Figure 4:
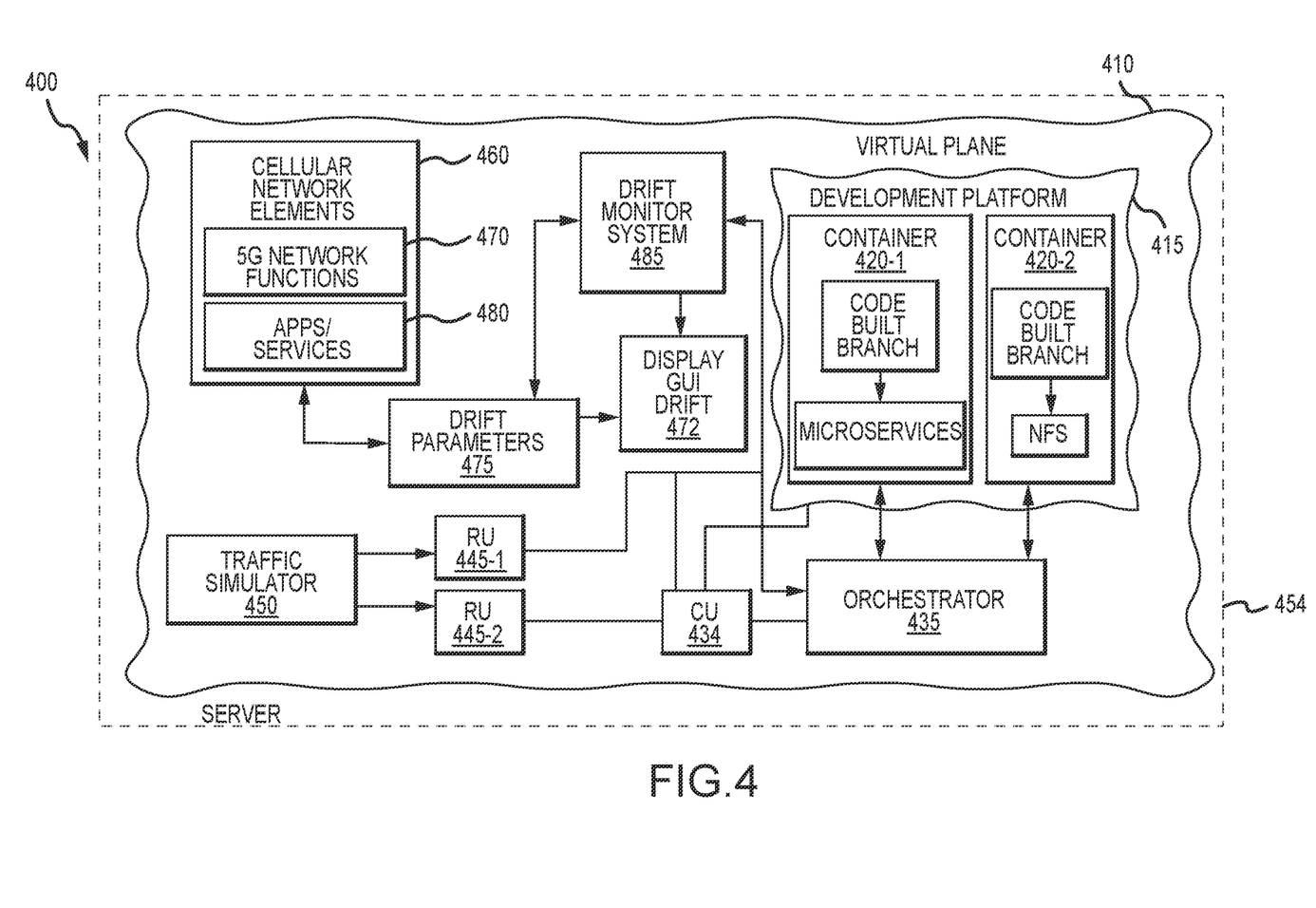
FIG. 4 illustrates an exemplary diagram of the virtual plane with the drift monitor system for monitoring a change in the drift parameter in a test simulation caused by development of instructional code of a branch associated with a container corresponding to a virtualized network function or microservice of components of a cellular infrastructure in accordance with various exemplary embodiments.

FIG. 4 illustrates an exemplary diagram of the virtual plane with the drift monitor system for monitoring a change in the drift parameter in a test simulation caused by the development of instructional code of a branch associated with a container corresponding to a virtualized network function or microservice of components of cellular infrastructure in accordance with an embodiment. In the vRan, cloud RAN, or O-Ran implementations, various components of the cellular network can include software components, and the cellular components with the orchestrator 435 can be implemented in part in software and be locally provisioned by separate server clusters. FIG. 4 illustrates in system 400 a virtual plane 410 on an exemplary server 454 of a third party that includes containers 420-1, 420-2, . . . 420-n that correspond to aspects of network functions and services (i.e., as microservices), and developed branches 430-1, 430-2, 430-n developed as software components to the physical network components.

In an exemplary embodiment, virtual components (as selective physical components) are executed via a simulated test via a traffic simulator 450 that implements applications of a set of virtual RUs developed for different communication functions with various distributed virtual units (DU) 455-1 providing branch development for applications in higher and lower layers in protocol stacks (ex. channel coding, virtual functionalities, etc.), and applications for the central unit CU 434 that communicates with an orchestrator 435. The development platform 415 as an example, can include particular containers 420-1, 420-2, . . . 420-n that work with the network functions 470 and services 480. KUBERNETES® or other container orchestration platforms can be used to create, revise, delete the containers that are used for software development and include the branches for code associated with the subunits or microservices of the cellular components that have been virtualized. KUBERNETES® allows for easy scaling and distribution and management of the containerized software products for components throughout the cellular system. Also, KUBERNETES® can be used to determine the parameters that require monitoring for drift analysis (ex. the data flow between the components orchestrated by the orchestrator 435). The drift monitor system 485 includes a software processing application with configured sets of algorithms to monitor and compute changes caused by the changes in code developed and implemented between the virtual components in the virtual plane 410 and the physical infrastructure and components of the 5G network 460 when deployed. The traffic simulator 450 enables virtual testing in the development platform 415 that enables developers to develop instructional code in branches via the containerization for services 480 and network functions 470, and to test the impact of the new code which has been separately developed via KUBERNETES® containers in the development platform 415 and deployed or integrated with the virtualized network functions and services prior to deployment in the physical infrastructure. The drift analysis can also be performed with the canary deployment of the new branch code and services to end-users.

The graphical user interface 472 enables the developers to have visibility in a monitored set of drift parameters 475 that is configured for the drift monitor tool of the drift monitor system 485. Various components as selected by the developers may be virtualized on the virtual plane 410. The orchestrator 435 can instantiate various branches developed by the selection of containers for orchestration. For example, loading of the configured branch container can be performed in accordance with a Service Order Management that is imposed by the customer/business side for assigning and updating services to network slices and for managing the lifecycle of slices.

Figure 5:
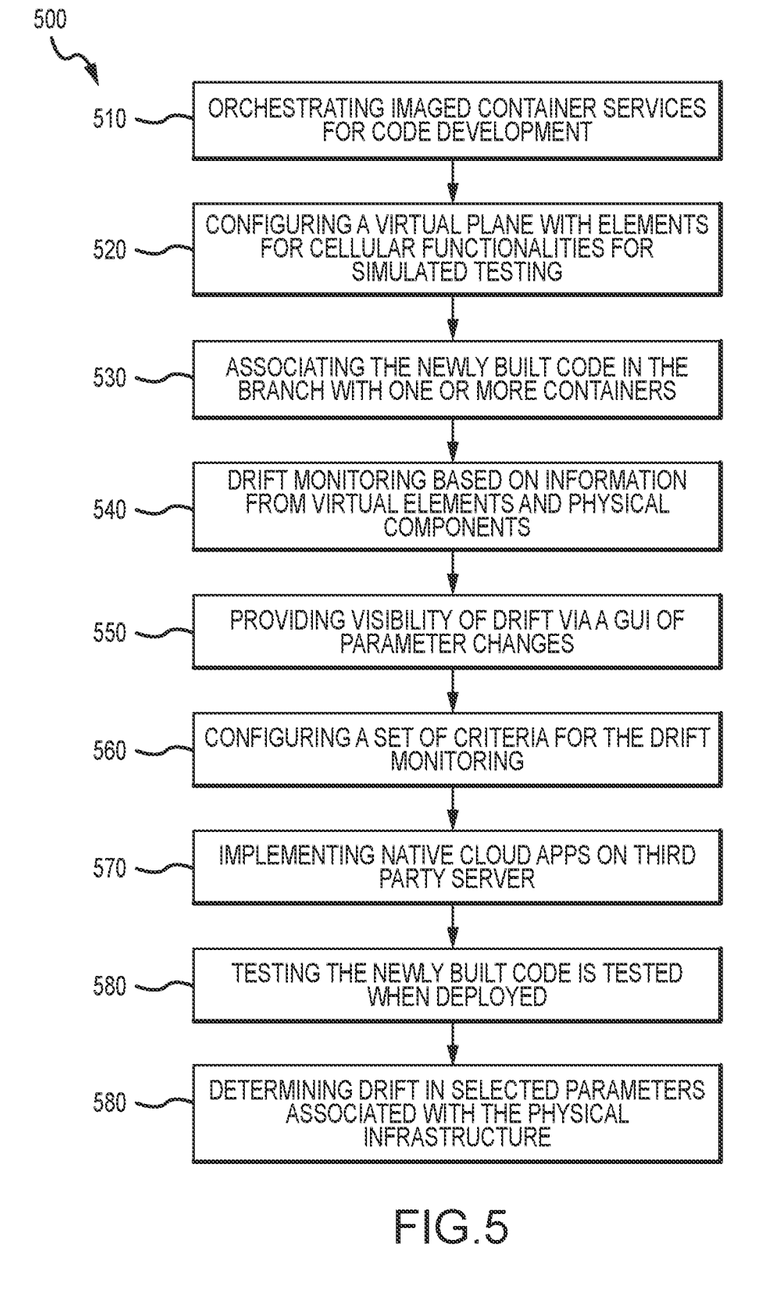
FIG. 5 illustrates a flow diagram of implementation of the drift monitor system for monitoring a change in the drift parameter in a test simulation caused by development of instructional code of a branch associated with a container corresponding to a virtualized network function or microservice of components of a cellular infrastructure in accordance with various exemplary embodiments.

FIG. 5 illustrates a flow diagram of an implementation of the drift monitor system for monitoring a change in the drift parameter in a test simulation caused by the development of instructional code of a branch associated with a container corresponding to a virtualized network function or microservice of components of cellular infrastructure in accordance with various exemplary embodiments.

In FIG. 5, in the flow diagram 500, at step 510, the services or network functions are selected and imaged via a container platform with orchestration to a virtual plane (virtual platform) of a cloud-based application supported by a third party server for code development. The virtual plane is configured with elements for cellular functionalities that include, at step 520, a set of core network components in the virtual plane associated with a network slice to provide network functions and microservices. The virtual plane includes a development test environment for developing at least an instructional set of the branch code. At step 530, the development test environment is configured by a development application that enables the building of the instructional set of branch code and associating the newly built code in the branch with one or more containers that clone a plurality of network functions and microservices of the cellular services deployed in physical infrastructure. In step 540, a drift monitoring system is configured to receive information from an orchestrator, the physical infrastructure of the cellular network and to monitor during a traffic simulation instigated by a traffic simulator, an amount of drift that occurs or has occurred and also drift that is caused directly and indirectly (i.e., impacted) by the newly built branch code which was developed in the virtual plane. The drift monitoring system can assess the drift based on certain criteria associated with one or more containers of cloned network functions and microservices executed in the development test environment in the virtual plane. In exemplary embodiments, the amount of drift can be computed by a comparison of operations of the network functions and microservices contained in the physical infrastructure with virtual test simulations of traffic with various cloud-based cellular components instantiated by the cloud orchestrator unit of the container platform in use. At step 550, a graphical user interface displays current, prior, and ongoing drift occurring or likely to occur when the newly built code is deployed in the physical infrastructure. In exemplary embodiments, the graphical user interface displays drift information to the developer based on a set of parameters that have been selected by the developer, and the criteria are likely linked to enable determining of the impact (i.e., the computed amount of drift by a developed branch code of containerized cloned network functions and microservices in the physical infrastructure) caused by execution of the new code in containerized functions prior to deployment of the new code in the physical infrastructure. At step 560, the developer may configure via the graphical user interface a set of criteria (i.e, parameters) for the drift monitoring system to display in conjunction with drift caused in the graphical user interface and also generate a computed or determined amount of drift caused by the traffic simulation in conjunction with branch code execution. At step 570, the containerized network functions and microservices are hosted on a third-party cloud server and the developed branch code is deployed in native cloud applications providing the network functions and microservices to cellular components of a network slice on the third-party platform.

At step 580, the newly built code is tested when deployed with at least one network function or microservice application with one or more native cloud applications configured in at least one layer of an app layer, service layer, orchestration layer, application layer, virtual machine layer and physical layer of the physical infrastructure. The network function includes a policy and charging control function (PCFs), Binding Support Function (BSFs), Network Exposure Function (NEFs), Network Slice Selection Function (NSSF), Service Communications Proxy (SCP) function, and Security Edge Protection Proxy (SEPP) function. At step 590, the drift is determined or computed based on changes in various selected parameters associated with the physical infrastructure that include parameter changes in configurations of components of the network slice when the developed branch code is executed by the network functions or microservices in at least a control plane of the physical infrastructure. The drift determined or computed can change increasingly over a period of time due to a plurality of factors at least comprising updates on components contained in network slices.

It should be noted that the general systems, structures, and techniques described above may be inter-combined, enhanced, modified, and/or otherwise implemented to provide any number of different features. In particular, the term "exemplary" is used herein to represent one example, instance, or illustration that may have any number of alternates. Any implementation described herein as "exemplary" should not necessarily be construed as preferred or advantageous over other implementations.

For the sake of brevity, conventional techniques related to broadcasting, streaming, networking, wireless communications, content distribution or delivery, communications standards or protocols, encoding/decoding standards or protocols, content formats, and other functional aspects of the systems (and the individual operating components of the systems) may not be described in detail herein. The subject matter may be described herein in terms of functional and/or logical block components, and with reference to symbolic representations of operations, processing tasks, and functions that may be performed by various computing components or devices. It should be appreciated that in alternative embodiments, the various block components shown in the figures may be equivalently realized by any number of components configured to perform the specified functions. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus is not intended to be limiting. For example, terms such as "first," "second" and other such numerical terms referring to structures do not imply a sequence or order unless clearly indicated by the context.

While several exemplary embodiments have been presented in the foregoing detailed description, it should be appreciated that a vast number of alternate but equivalent variations exist, and the examples presented herein are not intended to limit the scope, applicability, or configuration of the invention in any way. On the contrary, various changes may be made in the function and arrangement of the various features described herein without departing from the scope of the claims and their legal equivalents. Accordingly, details of the exemplary embodiments or other limitations described above should not be read into the claims absent a clear intention to the contrary.

What is claimed is:

1. A system to monitor drift in code branches associated with virtualized containers of cellular services, comprising:
   a processor in electronic communication with a non-transitory memory, the processor configured to run a virtual platform comprising a configuration of core network components in a virtual plane associated with a network slice, wherein the virtual plane includes a plurality of network functions and microservices, wherein the virtual plane comprises a development test environment for developing instructional sets comprising branch code;

a development application to configure the instructional sets comprising the branch code for associating with the virtualized containers, wherein the virtualized containers run on the processor and clone the network functions and microservices of the cellular services;
a drift monitoring tool that, based on simulations from tests of the developed branch code executed with the virtualized containers, provides data regarding the drift caused by the branch code to operations of the network functions and microservices; and
a graphical user interface that displays parameters related to a tested impact of the developed branch code prior to deployment of the developed branch code in virtualized containers running on the processor.

2. The system of claim 1, further comprising:
a set of criteria to configure the drift monitoring tool and for displaying in the graphical user interface a computed amount of the drift caused by a traffic simulation in conjunction with branch code execution.

3. The system of claim 2, further comprising:
wherein the set of criteria comprises at least development time and changes in network parameters resultant from a branch code deployment in the virtualized containers running on the processor.

4. The system of claim 1, further comprising:
wherein the virtualized containers running the network functions and microservices are hosted on a third-party platform.

5. The system of claim 4, further comprising:
wherein the developed branch code is deployed in native cloud applications providing the network functions and microservices to cellular components of a network slice on the third-party platform.

6. The system of claim 4, further comprising:
the virtual platform configured at least with at least one container of instruction code with the developed branch code associated with at least one network function deployed for testing with one or more native cloud applications configured in at least one layer of an app layer, service layer, orchestration layer, application layer, virtual machine layer, and physical layer.

7. The system of claim 4, further comprising:
the virtual platform configured at least with at least one container of instruction code with the developed branch code associated with at least one microservice application deployed for testing with one or more native cloud applications configured in at least one layer of an app layer, service layer, orchestration layer, application layer, virtual machine layer, and physical layer.

8. The system of claim 6, further comprising:
wherein the at least one network function comprises a policy and charging control function (PCFs), Binding Support Function (BSFs), Network Exposure Function (NEFs), Network Slice Selection Function (NSSF), Service Communications Proxy (SCP) function, and Security Edge Protection Proxy (SEPP) function.

9. The system of claim 1, further comprising:
wherein the drift comprises a computed change in a parameter of a configuration of components of the network slice when the developed branch code is executed by the network functions or microservices in a control plane; and
wherein the computed change is increases over a period of time due to a plurality of factors comprising updates on components contained in network slices.

10. A method for monitoring drift in a branch code associated with virtualized containers of cellular services running on a processor in communication with a non-transitory memory, the method comprising:
configuring, on a virtual platform running on the processor, core network components in a virtual plane associated with a network slice to provide network functions and microservices, wherein the virtual plane comprises a development test environment for developing an instructional set of the branch code;
configuring, by a development application, the instructional set of the branch code for associating with the virtualized containers that clone network functions and microservices of the cellular services, wherein the virtualized containers are deployed in physical cloud-based infrastructure;
computing, by a drift monitoring tool from test simulation of traffic in the virtual plane, an amount of the drift caused by the branch code associated with the virtualized containers of the cloned network functions and microservices, wherein the branch code is executed in the development test environment in the virtual plane, wherein the amount of the drift computed is by comparison to operations of the network functions and microservices running on the physical cloud-based infrastructure; and
displaying, in a graphical user interface based on a set of parameters, an impact of the amount of the drift prior to deployment of the branch code on the physical cloud-based infrastructure.

11. The method of claim 10, further comprising:
configuring a set of criteria for the drift monitoring tool for displaying in the graphical user interface and generating the amount of the drift caused by a traffic simulation in conjunction with branch code execution.

12. The method of claim 10, further comprising:
configuring a set of criteria of the drift monitoring tool for displaying in the graphical user interface the amount of the drift caused by a traffic simulation in conjunction with branch code execution.

13. The method of claim 12, further comprising:
wherein the virtualized containers running the network functions and microservices are hosted on a third-party platform.

14. The method of claim 13, wherein the branch code is deployed in native cloud applications providing the network functions and microservices to cellular components of a network slice on the third-party platform.

15. The method of claim 13, further comprising:
configuring in the virtual plane with at least one container of instruction code with the branch code associated with at least one network function deployed for testing with one or more native cloud applications configured in at least one layer of an app layer, service layer, orchestration layer, application layer, virtual machine layer, and physical layer.

16. The method of claim 13, further comprising:
configuring the virtual platform with at least one container of instruction code with the branch code associated with at least one microservice application deployed for testing with one or more native cloud applications configured in at least one layer of an app layer, service layer, orchestration layer, application layer, virtual machine layer, and physical layer.

17. The method of claim 14, further comprising:
wherein at least one network function comprises a policy and charging control function (PCFs), Binding Support Function (BSFs), Network Exposure Function (NEFs), Network Slice Selection Function (NSSF), Service Communications Proxy (SCP) function, and Security Edge Protection Proxy (SEPP) function.

18. The method of claim 10, further comprising:
wherein the drift at least comprises a computed change in a parameter of a configuration of components of the network slice when the branch code is executed by the network functions or microservices in at least a control plane of the physical infrastructure; and
wherein the drift computed change is increasingly different over a period of time due to a plurality of factors at least comprising updates on components contained in network slices.

19. A computer program product tangibly embodied in a computer-readable storage device that stores a set of instructions that, when executed by a processor, cause the processor to perform a method to monitor drift in a cellular network running on tangible, cloud-based infrastructure, the method comprising:
configuring, on a virtual platform running on the tangible, cloud-based infrastructure, core network components in a virtual plane, the core network components associated with a network slice to provide a plurality of network functions and microservices, wherein the virtual plane comprises a development test environment for developing instructional sets of branch code;
configuring, by a development application running on the tangible, cloud-based infrastructure, an instructional set comprising the branch code for associating with a container, wherein the container that clones the plurality of network functions and microservices of the cellular network deployed in the tangible, cloud-based infrastructure;
computing, by a drift monitoring tool from test simulation of traffic in the virtual plane, an amount of the drift caused by the branch code associated with the container of the cloned network functions and microservices, wherein the amount of the drift computed is by comparison to operations of the network functions and microservices running on the tangible, cloud-based infrastructure; and
displaying, in a graphic user interface based on a set of parameters, an impact of the amount of the drift prior to deployment of the developed branch code in the cellular network running on the tangible, cloud-based infrastructure.

20. The computer program product of claim 19, wherein the method further comprises:
configuring in the virtual plane with at least one container of instruction code with the developed branch code associated with at least one network function or microservices deployed for testing with one or more native cloud applications configured in at least one layer of an app layer, service layer, orchestration layer, application layer, virtual machine layer and physical layer of the cellular network running on the tangible, cloud-based infrastructure.

* * * * *